Dec. 13, 1949 R. J. STAVA 2,491,224
APPARATUS FOR LAMINOGRAPHY
Filed June 15, 1944 9 Sheets-Sheet 1

FIG. 1.

INVENTOR
ROBERT J. STAVA
BY Hyde and Meyer,
ATTYS.

Dec. 13, 1949 R. J. STAVA 2,491,224
APPARATUS FOR LAMINOGRAPHY
Filed June 15, 1944 9 Sheets-Sheet 2

INVENTOR
ROBERT J. STAVA
BY Hyde and Meyer
ATTORNEYS.

Dec. 13, 1949 R. J. STAVA 2,491,224
APPARATUS FOR LAMINOGRAPHY
Filed June 15, 1944 9 Sheets-Sheet 3

INVENTOR
ROBERT J. STAVA
BY Hyde and Meyer
ATTORNEYS

Dec. 13, 1949 R. J. STAVA 2,491,224
APPARATUS FOR LAMINOGRAPHY
Filed June 15, 1944 9 Sheets-Sheet 4

INVENTOR
ROBERT J. STAVA
BY Hyde and Meyer
ATTORNEYS

Dec. 13, 1949     R. J. STAVA     2,491,224
APPARATUS FOR LAMINOGRAPHY Filed June 15, 1944     9 Sheets-Sheet 5

INVENTOR
ROBERT J. STAVA
BY Hyde and Meyer
ATTORNEYS.

Dec. 13, 1949 R. J. STAVA 2,491,224
APPARATUS FOR LAMINOGRAPHY
Filed June 15, 1944 9 Sheets-Sheet 7

INVENTOR
ROBERT J. STAVA
BY Hyde and Meyer
ATTORNEYS

FIG. 17.

INVENTOR
ROBERT J. STAVA
BY Hyde and Meyer
ATTORNEYS

Patented Dec. 13, 1949

2,491,224

UNITED STATES PATENT OFFICE 2,491,224

APPARATUS FOR LAMINOGRAPHY

Robert J. Stava, University Heights, Ohio, assignor to Picker X-Ray Corporation, Waite Manufacturing Division, Inc., Cleveland, Ohio, a corporation of Ohio Application June 15, 1944, Serial No. 540,480

17 Claims. (Cl. 250—61.5)

1

This invention relates to improvements in drive and control means for apparatus used in laminography.

My invention is utilized in connection with apparatus in which an X-ray tube and a sensitized plate holder are mounted for reciprocation or oscillation on opposite sides of a body to be viewed or photographed. In this type of apparatus, the focal point or focal plane is fixed at the level of body section to be viewed and oscillation of the tube and plate holder during radiography causes a fogging of all layers not in the focal plane. It is necessary that this oscillation be of fairly large amplitude if the plane photographed is to represent a very thin layer of body tissue. A shorter amplitude photographs a thicker layer, and an amplitude greater than that herein provided is of little value. It is desirable that the apparatus oscillating the tube and plate holder have uniform linear motion during the period the photograph is taken.

An object of the present invention is to provide a novel drive means for oscillating the tube and plate holder in such an apparatus and particularly one in which the driving means moves in a continuous or endless elongated path and wherein the driving means is given uniform linear motion along a portion of said path. Means is provided operable while the drive means is moving with uniform linear motion to initiate the taking of the photograph, and this last named means is variable in its action so as to provide for various lengths of exposure required.

My invention provides also, in addition to the features mentioned in the preceding paragraph, means for varying the speed of the drive means so that wide range of variable exposures is provided by the combination of varying speeds and varying lengths of exposure along the path of travel of the drive means.

It should be understood that the X-ray tube and the plate holder together with their necessary supports and attached electrical cables provide apparatus of considerable weight. My improved drive means is provided with means for reducing its speed as the drive means passes around reverse bends at the opposite ends of its elongated path of travel.

Novel means is provided for coordinating the setting of the governor speed for the electrical motor connected with the driving means and for adjusting a resistance in said motor circuit to be cut into and out of the motor circuit as the driving means reverses its direction of movement at opposite ends of its path of travel.

2

My invention also provides a simple arrangement connected with the above-described apparatus whereby stereoscopic radiographs may be taken utilizing the same apparatus. To this end, novel means is provided for insuring that the drive means always stops in a fixed position, and means is provided for moving the drive means a limited distance along its path of travel from said fixed stopping point when taking stereoscopic pictures.

Other novel features of my invention will be found in the arrangement of the various parts for carrying out the above-described purposes and in the electrical control circuits for producing the various results explained, together with novel arrangements of cams and switches, motor drives, governor controls, rheostats and the like for producing the desired results. All of these features will be fully described in the specification, and the essential features thereof will be set forth in the appended claims.

In the drawings,

Fig. 17 is a perspective view showing my device connected with the X-ray tube supporting column near the ceiling instead of the mounting near the table shown in Fig. 1; while

Figure 1:
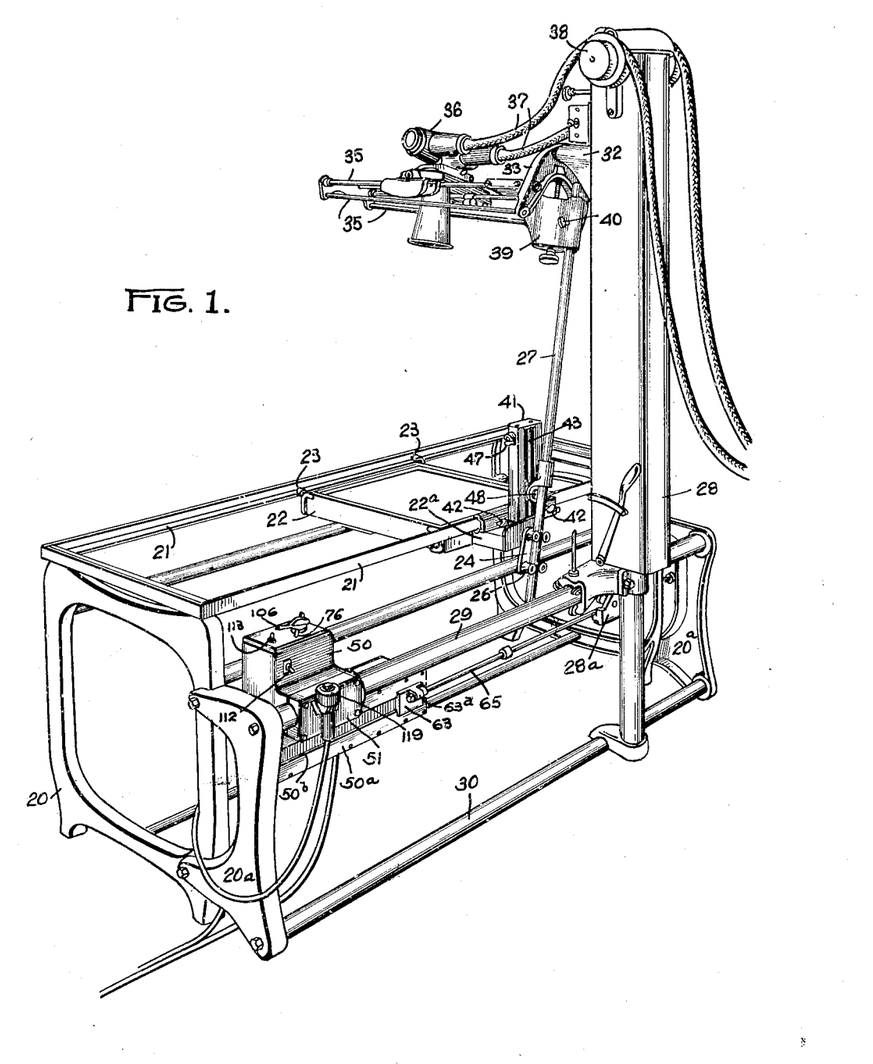
Fig. 1 is a perspective view of X-ray apparatus equipped with my improved device with the top of the table removed for a better understanding of the apparatus.
Figures 14, 15, 16:
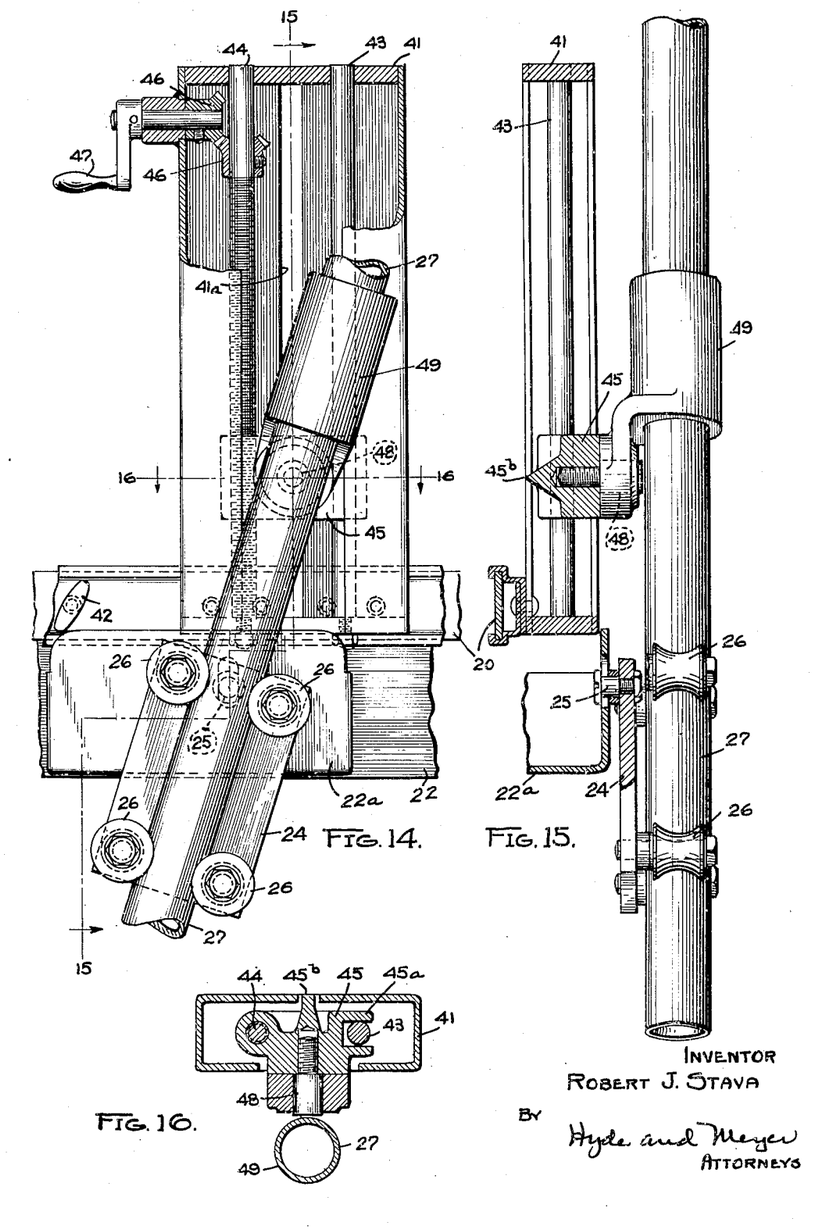
Fig. 14 is an elevational view of the apparatus connected to the side of the table near the plate holder of Fig. 1 with parts broken away to more clearly show the construction.
Figs. 15 and 16 are sectional views taken along similarly numbered lines of Fig. 14.

In Fig. 1 I have shown a general view of X-ray apparatus equipped with my new device. This apparatus includes a table 20 intended to be provided with the usual top on which a patient lies during examination, but this top has been removed to more clearly disclose the present invention. Beneath the table top riding upon suitable rails 21 is a plate holder 22 provided with rollers 23 resting on the rails. This plate holder is provided with an extension bracket 22a which projects beyond the edge of the table and carries a pivotally mounted friction-reducing bearing member 24, the details of which are best seen in Figs. 14 and 15. A pin 25 pivotally connects bracket 22a and plate 24. The pin 25 is in the center of the plate and is vertically adjustable in the slot in bracket 22a. On the opposite side of plate 24 are pivotally mounted four concave rollers 26 mounted in a common plane and having a curvature generally corresponding to the diameter of oscillating lever 27. Referring again to Fig. 1, a carriage or column 28 is mounted for movement lengthwise of table 20. To this end bars 29 and 30 are supported between brackets 20a which are connected to the opposite ends of the table 20. The column 28 at its base is provided with friction-reducing rollers which bear upon these two bars so that the column 28 is readily moved backward and forward lengthwise of the table.

Figures 11, 12, 13:
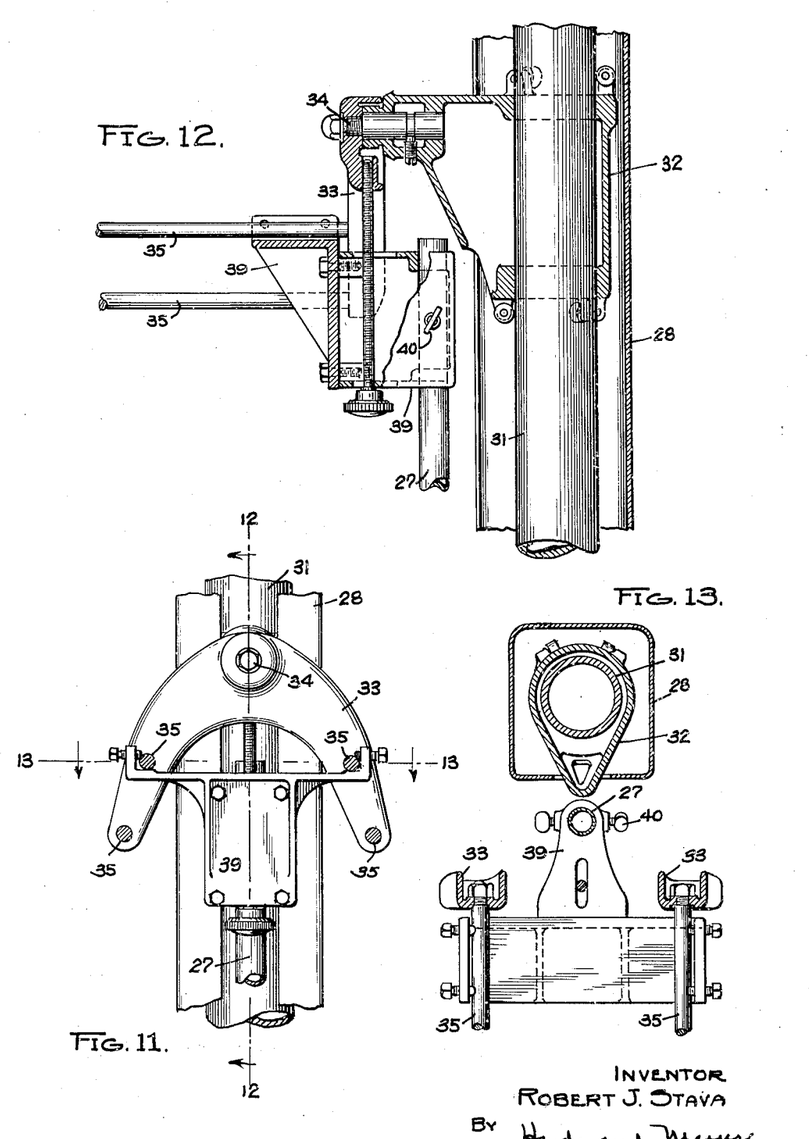
Fig. 11 is an elevational view of the X-ray tube mounting bracket seen near the tube in Fig. 1.
Figs. 12 and 13 are sectional views taken along similarly numbered lines of Fig. 11.

Referring to Figs. 11, 12, and 13 together with Fig. 1, the column 28 has mounted within it an upright tube 31 on which is mounted a bracket 32 for travel vertically along the tube. Pivotally mounted on this bracket is a U-shaped arm 33 adapted to oscillate about pivot 34. The arm 33 carries a plurality of rods 35 on which is mounted an X-ray tube 36. This tube is energized through a pair of high tension cables 37 which preferably pass over rollers 38 at the top of column 28. The X-ray tube is provided with the usual accessories and adjustments which need not be described here as they are well-known to those skilled in the art. Secured to the arm 33 is a bracket 39, the rear end of which provides a sleeve embracing the oscillating lever 27. A thumb screw 40 locks the lever 27 to the bracket 39.

The above-described apparatus provides on opposite sides of the body to be photographed the plate holder 22 and an X-ray tube 36 mounted for oscillation. Means is provided for fixing the pivotal point for lever 27 in the desired focal plane of the body section to be viewed or photographed. Referring to Figs. 1, 14, 15, and 16, a stand 41 is fixed to the side of table 20 by means of thumb screws 42. Thus, this stand is adjustable lengthwise of the table. In this stand are supported a vertically extending rod 43 and a parellel screw 44 rotatably mounted in the stand 41. A bracket 45 has threaded engagement with the screw 44 and has a U-shaped portion 45a slidably embracing the rod 43 as best seen in Fig. 16. Means is provided for rotating the screw 44, this means comprising a pair of mutually engaging beveled pinions 46 one fixed on screw 44 and the other rotatably mounted in the stand 41 and provided with the crank handle 47. Thus by rotating the handle 47 screw 44 is rotated and bracket 45 is caused to move vertically in the stand 41. A pointer 45b extends through a slit 41a in the stand 41 so as to visually indicate the position of the movable pivot 48. This pivot connects bracket 45 with sleeve 49 which slidably embraces lever 27. It will be apparent from the above description that with the pivot 48 fixed at the desired level, the column 28 may be moved backward and forward and in so doing it will cause the X-ray tube to oscillate about pivot 34 in bracket 32 while plate holder 22 will oscillate in the opposite direction beneath the body of the patient so that a picture may be taken, on the sensitized plate carried in the holder 22, of the body section at the level of the pivot 48 while all other layers of the body will be fogged.

Figures 4, 5:
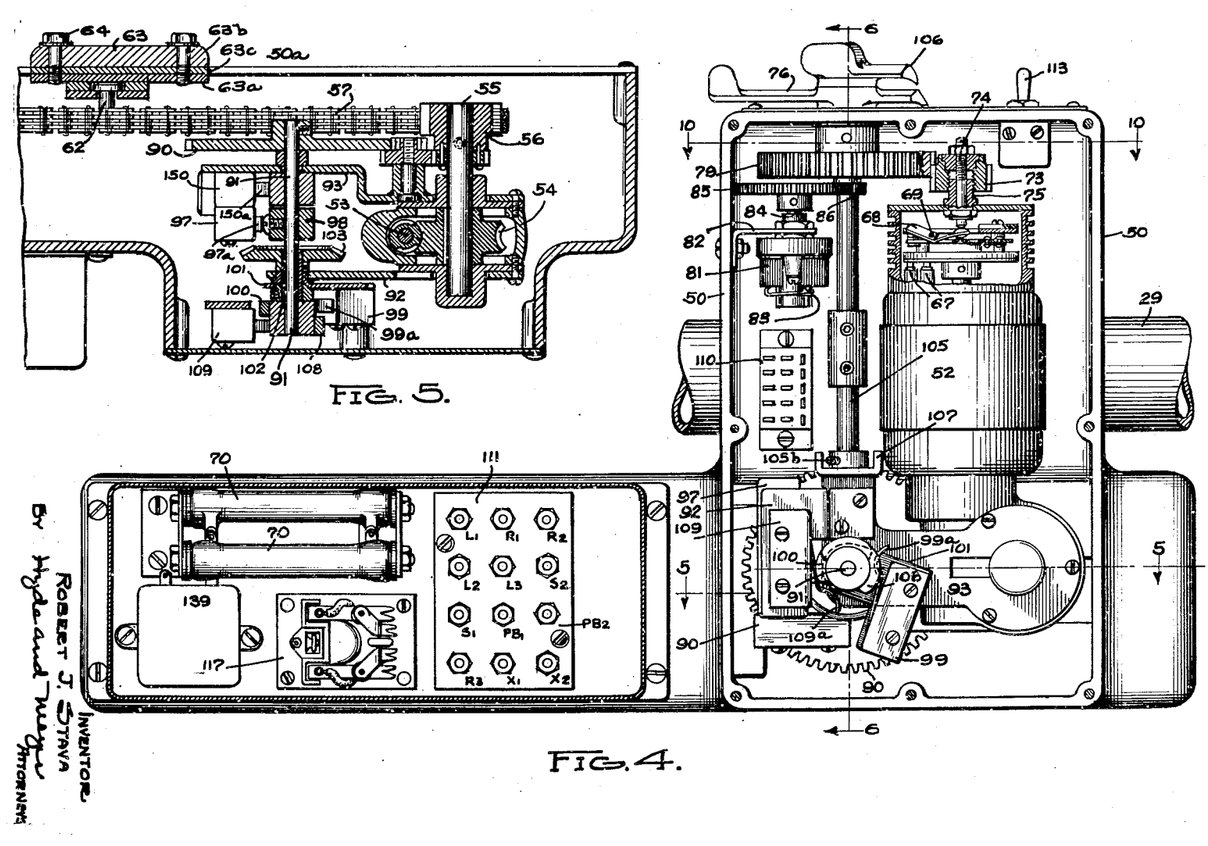
Fig. 4 is a rear view of the device of Fig. 2 with the covers removed to more clearly show the parts.
Fig. 5 is a fragmental sectional view taken along the line 5—5 of Fig. 4.
Figure 6:
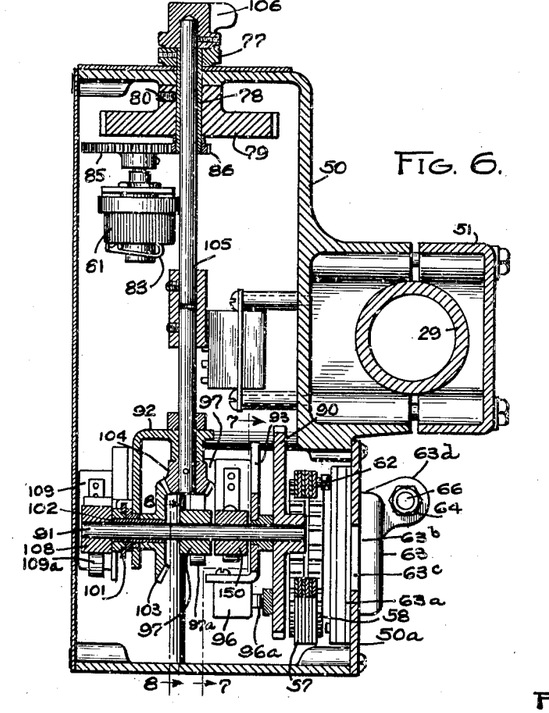
Fig. 6 is a vertical sectional view taken along the line 6—6 of Fig. 4.
Figures 9, 10:
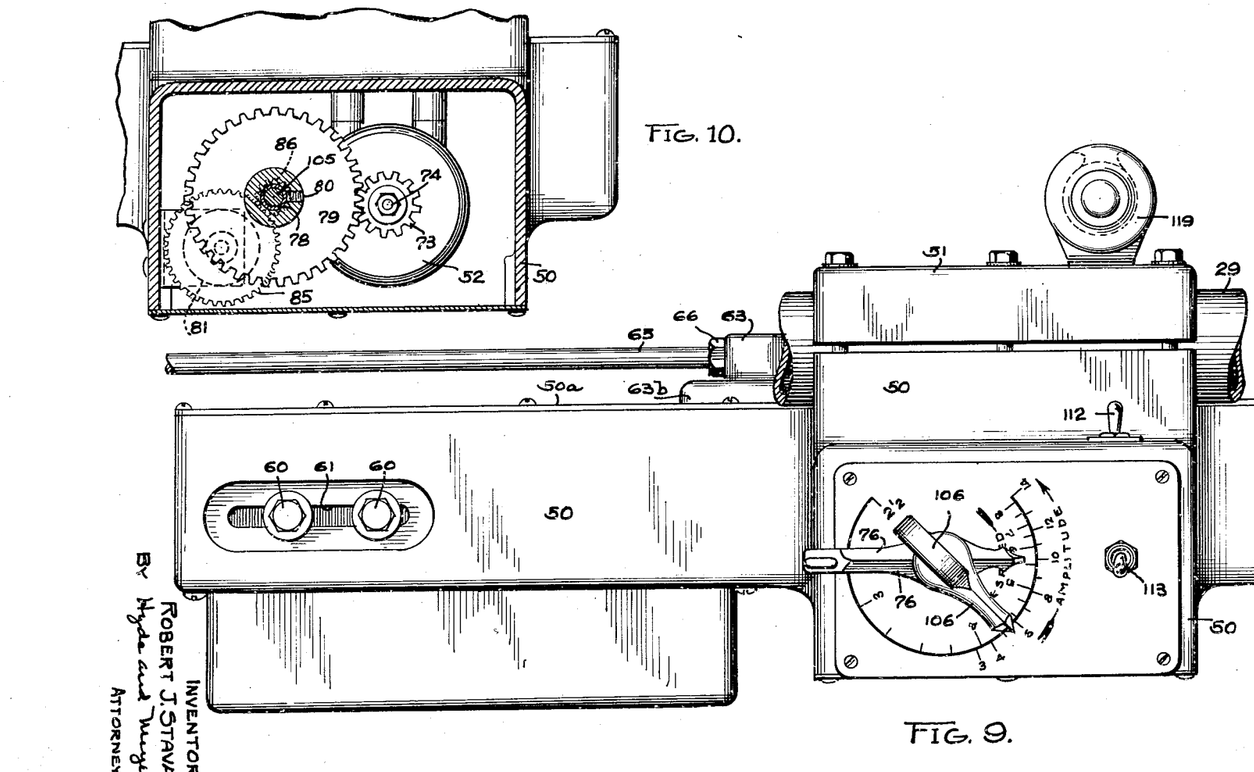
Fig. 9 is a top plan view of the device of Figs. 2 and 4.
Fig. 10 is a fragmental sectional view taken along the line 10—10 of Fig. 4.

My invention provides novel means for causing the movement of the column 28 backwards and forwards along the bars 29 and 30. The device is indicated within the housing 50 at the left end of bar 29 in Fig. 1 and clamped to said bar by means of the clamping member 51. Referring to Figs. 4 and 5, suitably mounted within the housing is an electric motor 52 which drives shaft 53 and through suitable reduction gearing drives the worm wheel 54 which in turn is keyed to shaft 55 on which is fixed sprocket 56. A chain 57 connects sprocket 56 with sprocket 58 (see Fig. 2) which is rotatably carried by a bracket 59 which is mounted by means of bolts 60 for adjustment along the slot 61 in a portion of housing 50 as best seen in Fig. 9.

Driving means is provided between chain 57 and the column or carriage 28. This means comprises a cross-head pin 62 carried by chain 57 with the head of the pin vertically reciprocable in a cross-head slide 63 which is best seen in Figs. 2, 3, 5, and 6. This cross-head slide has parts 63a and 63b located respectively inside and outside of a plate 50a which forms part of the housing 50. A gib 63c slides along the slotted opening 50b in the plate 50a, all of the parts 63a, 63b, and 63c being held together by the bolts 64. On the outside portion 63b of the cross-head slide is carried an ear 63d through which passes a rod 65 held in place by the nuts 66. The other end of the rod 65 is adjustably secured in a clamp 28a secured to column 28 as best seen in Fig. 1. It results from this construction that when motor 52 is operated chain 57 travels about the sprockets 56 and 58 carrying cross-head pin 62 first toward the right as viewed in Fig. 2 along the top run of chain 57, then as pin 62 goes around sprocket 58 in the direction of the arrow there indicated, the cross-head pin will move downward in the cross-head slide while the slide dwells at the right-hand end of its travel after which pin 62 will return toward the left along the bottom run of chain 57 until it passes around sprocket 56 when the pin again travels vertically upward in the slide while the slide dwells at the left end of its run after which pin 62 will again move toward the right along the top run of the chain returning to the starting point. It is during such a cycle of operation that my laminographic apparatus is operated to produce an X-ray picture as will presently be described.

Means is provided for varying the speed of motor 52 so as to vary the speed of travel of cross-head pin 62 as it follows the path of endless chain 57. Any suitable means may be utilized for this purpose, but I have illustrated in Fig. 4 the construction shown in Patent 2,291,639 granted August 4, 1942, to Royal Lee to which reference may be made for a more complete description if one is desired. It is sufficient to state here that the pair of contacts 67 in the energizing circuit of motor 52 (as will be later described in connection with Fig. 18) are separated when the motor speed exceeds the predetermined speed by the action of weight 68 about pivot 69. This places resistors 70 in series with the windings 71 and 72 of motor 52 so that it slows down. Actually the contacts 67 flutter at a high frequency and the speed of motor 52 is held nearly constant. In place of the speed-controlling screw 46 of the aforesaid Letters Patent, I have substituted the pinion 73 which is fixed on stem 74 so that the two rotate together. Stem 74 is rotatable and slidable in the internal bore of a bushing 75 fixed to the motor housing, and pinion 73 has a threaded engagement with the bushing 75. It results from this construction that as pinion 73 is rotated stem 74 is moved up and down to control the position of weight 68 relative to the pivot 69. The means for controlling the position of pinion 73 comprises pointer 76 (Figs. 4, 6, and 9) which is connected through hub 77 and sleeve 78 with gear 79 which in turn meshes with pinion 73. The position of this gear on the sleeve is adjustable by means of set screw 80. It will be noticed in Fig. 4 that pinion 73 and gear 79 have faces sufficiently broad to permit the necessary movement of pinion 73 in and out to produce the motor-controlling effect above described.

Figures 2, 3:
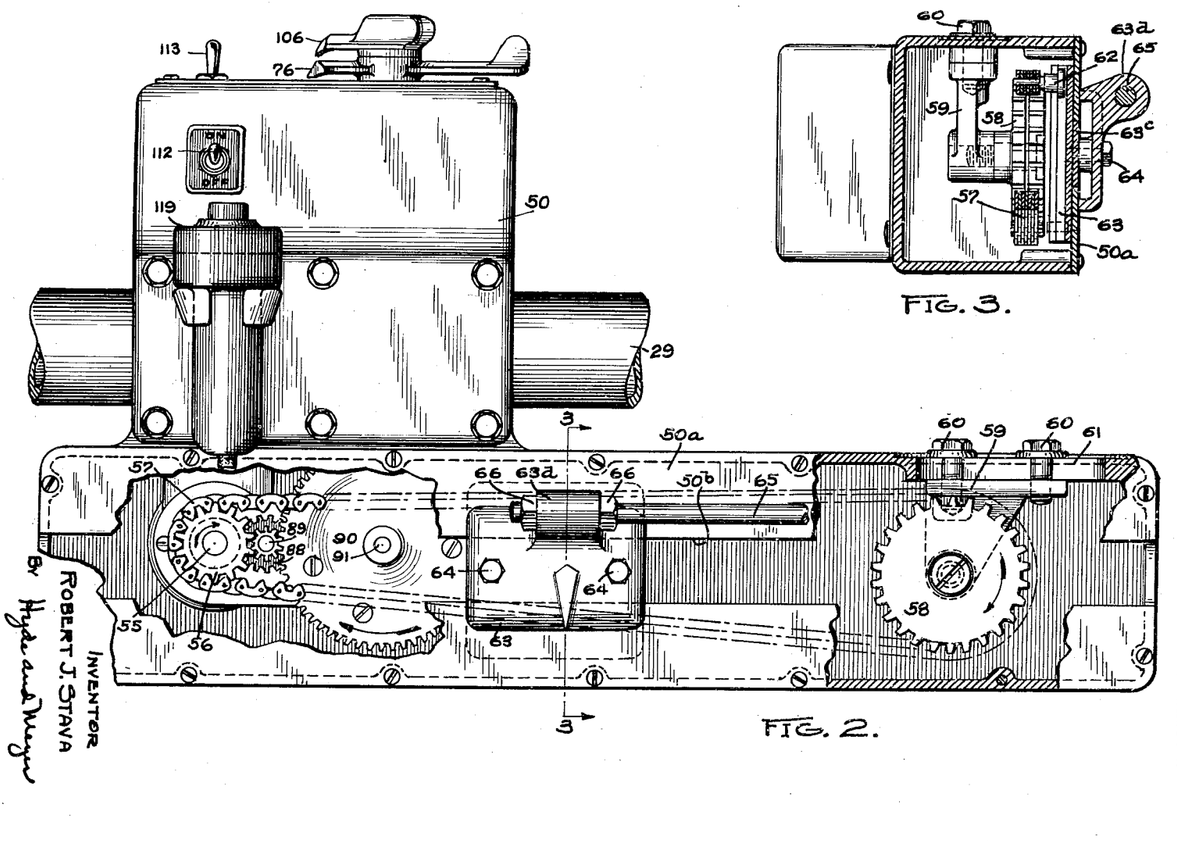
Fig. 2 is a front view of the device shown at the left end of the table of Fig. 1 with a portion of the cover plate removed to more clearly show the drive means.
Fig. 3 is a sectional view taken along the line 3—3 of Fig. 2.
Figure 7:
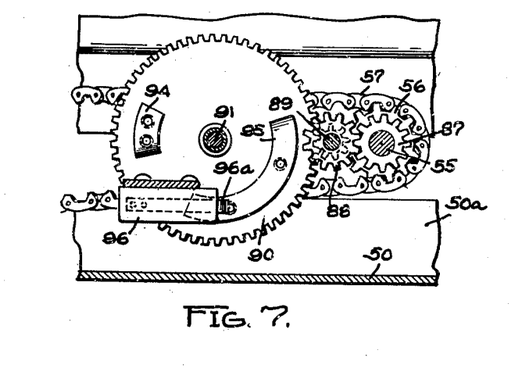
Figs. 7 and 8 are fragmental sectional views taken along similarly numbered lines of Fig. 6.

It will be obvious that considerable weight is to be moved in the oscillation of the X-ray tube 36 and the plate holder 22 as previously described. This weight not only includes the parts just mentioned but the heavy column 28 and the lever 27 and associated parts. Obviously these parts must come to rest and change their direction of travel each time the cross-head pin 62 passes around one of the sprockets 56 or 58. To insure this reversal of movement of these parts with the minimum of wear and shock, I have provided means for slowing down motor 52 where the cross-head pin 62 makes the reverse bends at opposite ends of its path of travel. To this end, I have provided a resistance 81 (Figs. 4 and 6) in the form of a rheostat mounted on a suitable bracket 82 attached to housing 59. The resistance-selector arm 83 is rotatable with shaft 84 which carries at its upper end a gear 85 which in turn meshes with pinion 86 which is rigidly secured to sleeve 78 previously mentioned. Provision is made for automatically cutting the resistance 81 into and out of the energizing circuit for motor 52 at the desired points. This mechanism, as best seen in Figs. 2 and 7, comprises a gear 87, rotatable with shaft 55, driving an intermediate train of gears 88 mounted on a stub shaft 89 and meshing finally with a large gear 90 which in turn is rigidly fixed on jack shaft 91 which is rotatably supported in brackets 92 and 93. On one face of gear 90, as best seen in Fig. 7, are fixed a short cam 94 and a longer cam 95. These cams are adapted to engage and operate the blade 96a of a microswitch 96 suitably mounted on one of the brackets. The parts are so arranged that switch 96 is in its "off" position as represented by blade 96a in Fig. 18 when the cross-head pin 62 starts its cycle of travel from the position shown in Fig. 2. When the cross-head pin has about reached the top of sprocket 58 at the right-hand end of Fig. 2, short cam 94 moves switch 96 to the "on" position as indicated in dot-dash lines in Fig. 18. This continues until the cross-head pin has passed around sprocket 58 and is about to enter the lower run of chain 57 as viewed in Fig. 2. Then cam 94 releases switch blade 96a and the switch automatically returns to "off" position. Just before the cross-head pin reaches the lower side of sprocket 56, cam 95 again engages switch blade 96a and returns the switch to "on" position. The cam 95 then holds switch 96 in this position until the cross-head pin comes to rest at the end of its cycle in the position shown in Fig. 2. This insures not only a slower speed where motion is reversed when the cross-head pin passes around sprockets 56 and 58, but it also insures that all of the heavy parts previously mentioned are moving slowly when the parts come to rest with the cross-head pin and slide in the position shown in Fig. 2. This gives an accurate stopping position of the parts.

Means is provided for adjusting the position of the rheostat contact arm 83 in accordance with the setting of the motor governor as controlled by pinion 73. In other words, the connection between gear 79 and pinion 73 on the one hand and pinion 86 and gear 85 on the other hand is such that the higher the speed set for the governor of motor 52 the greater the resistance selected on rheostat 81 by the setting of arm 83. It results from this construction that practically no resistance on rheostat 81 is cut into the circuit of motor 52 when the slowest governor speed is selected as none is then necessary. But greater amounts of resistance are cut in as greater speeds are selected on the governor so as to insure a sufficient slowing down as the parts reverse their direction of movement at each end of the path of oscillation.

Figure 8:
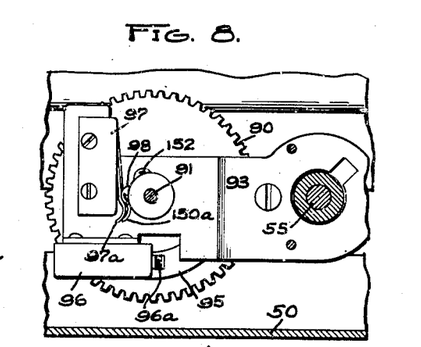

Means is provided for energizing motor 52 as will be later described in connection with wiring diagram Fig. 18 but means will here be described for automatically interrupting said motor energizing circuit when the cross-head and slide have completed a cycle and returned to the position of Fig. 2. To this end there is mounted on jack shaft 91 a stop switch 97 suitably mounted on bracket 93. This switch has a blade 97a which is normally in the "on" position indicated in dot-dash lines in Fig. 18 but which is moved to "off" position by means of a contact cam 98 mounted on jack shaft 91. This cam is best seen in Figs. 5 and 8. This cam has a very short dwell portion so that shortly after the closing of an energizing circuit for motor 52 cam 98 releases switch blade 97a so that this switch is normally in its "on" position.

Means is provided for energizing the electrical circuit for X-ray tube 36 while the cross-head pin 62 is traveling from right to left along the lower run of chain 57 as viewed in Fig. 2. This means comprises an exposure switch 99 (Fig. 4) mounted on a suitable bracket with its switch blade 99a positioned adjacent a cam 100 on the end of shaft 91. The switch 99 may control the exposure of the plate in holder 22 to the rays from tube 36 but preferably it performs the function of the manually operable button 36 shown in Patent 2,267,908, granted December 30, 1941, to Edwin R. Goldfield and Edward B. Graves, so that the resultant exposure is accurately timed as will be readily understood by those skilled in this art.

It is desirable that the number of seconds switch 99 is closed should roughly correspond to and be slightly greater than the desired time of exposure set on the timer of the above-mentioned Goldfield and Graves patent. To this end means is provided for varying the position of cam 100 so that switch blade 99a is moved to "on" position early or late as may be desired during the travel of cross-head pin 62 from right to left along the lower run of chain 57 as viewed in Fig. 2.

Referring to Figs. 4, 5, 6, and 9, switch 99 is mounted on bracket 101 which in turn is fixed to sleeve 102 which is rotatably mounted on jack shaft 91. Also fixed on sleeve 102 is beveled gear 103 which meshes with beveled gear 104 which is fixed on shaft 105 which in turn is rotatably mounted in an extension of bracket 92 at its lower end and is embraced by sleeve 78 (previously mentioned) at its upper end. The pointer 106 is fixed to the upper end of shaft 105 and reads on the outermost scale of Fig. 9 marked "amplitude." By means of this construction it is possible to rotate switch 99 relative to shaft 91 so that when pointer 106 is at the end of the scale marked "14" switch 99 is in a position clockwise of the position shown in Fig. 4 whereas when the pointer 106 is at the end of the scale marked "3" (Fig. 9) the switch 99 is moved counter-clockwise from the position shown in Fig. 4. In other words, cam 100 moves in the direction of the arrow indicated around shaft 91 in Fig. 4, and when switch 99 is moved in a clockwise direction from the position there shown, its blade 99a is engaged by cam 100 sooner and thus the period of closure of switch 99 is longer as indicated by the larger numbers on the amplitude scale. The rotation of shaft 105 is limited in one direction by a stop at its upper end (not shown) engaging a suitable pin in the top of housing 50 while the rotation in the opposite direction is limited by stop member 105b engaging one of the wings 107.

During the above description it will have been noticed that there is a cam 108 closely associated with cam 100 on the end of shaft 91. The purpose of this cam is to close switch 109 by means of its operating blade 109a at least one second ahead of the closing of switch 99. Switch 109 is used only when the X-ray tube 36 is provided with a rotating target and is for the purpose of insuring that the target is rotating when the tube is energized as will be readily understood by those skilled in this art. It has no other connection with this invention. The switch 109 is in fixed position and does not require any adjustment.

The wiring circuit of Fig. 18 will now be described so as to explain how all of the above-mentioned functions are carried out. As a preliminary matter it should be explained that the wiring block 110 is solely for purposes of assembly and testing, and in following the diagrams no reference will be made to this block but the circuits will be followed directly through the block without further mention. Also in the center of Fig. 4 there appears a wiring panel 111 which is indicated diagrammatically in Fig. 18, and this panel will be described as it is used in the wiring of our device to X-ray apparatus, supply circuits, etc. A main switch 112 is indicated on Figs. 2, 9, and 18 and a selective switch 113 for selecting between laminography and stereoscopic exposures (explained later) is indicated on Figs. 2, 4, 9, and 18.

Figure 18:
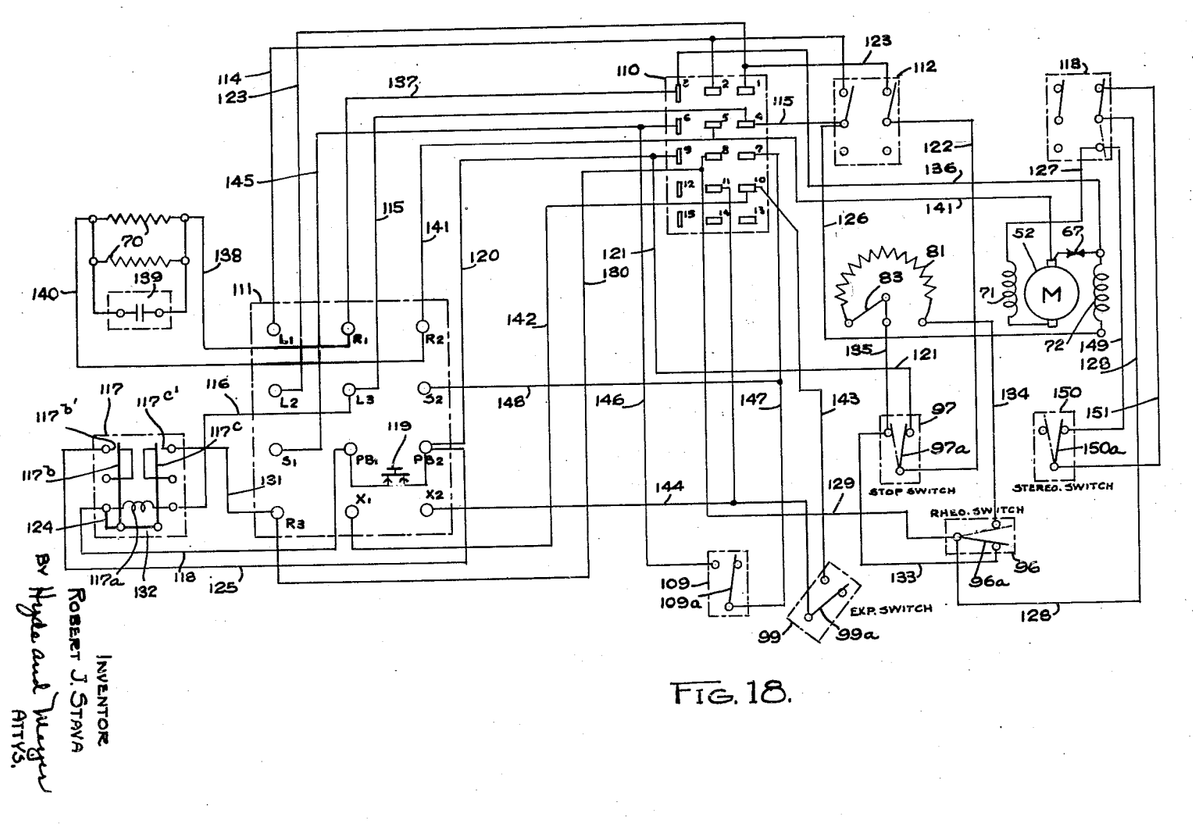
Fig. 18 is a wiring diagram showing the electrical connections for my device.

Referring now to Fig. 18, the binding posts L—1, L—2 on board 111 are connected to a suitable source of electric current. It is assumed that main switch 112 is closed as indicated and that switch 113 is in the dot-dash position of Fig. 18. The energizing circuit for motor 52 is established through relay 117 the circuit for which extends from L—1 through line 114, switch 112, line 115, binding post L—3, line 116, coil 117a of relay 117, line 118 to binding post PB. A connection is there established by the operator who manually operates push-button 119. This is preferably connected by a suitable cable with the binding posts PB1 and PB2 and a holding bracket on housing 50 retains the push-button device 119 in the position shown in Fig. 2 when not in use. Closure of this push-button continues the circuit through binding post PB2, line 120, line 121, and switch blade 97a in its "off" position, as shown in full lines in Fig. 18, and thence through line 122, main switch 112, and line 123 back to L—2. The push-button 119 need be held only an instant to energize relay 117 armature 117b of which immediately engages contact 117b' establishing a holding circuit from coil 117a through line 124, armature 117b and line 125 to PB2 and so on through the rest of the circuit outlined just above. The energizing of relay 117 causes armature 117c to engage contact 117c' and completing the following circuit for motor 52: From L—1 through line 114 and switch 112 as before and then through line 126, motor winding 72, governor contacts 67, motor 52, winding 71, line 127, switch 113 in its dot-dash position, lines 121, 128, 129, 130, 131, armature 117c, line 132, armature 117b, lines 125, 120, 121, blade 97a, line 122, switch 112, and line 123 to L2.

Upon very slight rotation of motor 52, cam 98 releases blade 97a of switch 97 whereupon this switch moves to its "on" position as indicated in dot-dash lines in Fig. 18. The circuit for motor 52 then runs from L1 to and through line 126 as previously described and thence through blade 96a of rheostat switch 96 in its full line position of Fig. 18 and through line 133, blade 97a, line 122, switch 112, and line 123 to L2. If rheostat switch 96a is in its dot-dash position, then the circuit is through line 134, rheostat 81, selector arm 83, line 135, blade 97a, line 122, and so back to L2. Meanwhile the holding circuit for relay coil 117a is from L1 through switch 112 and lines 115 and 116 as mentioned previously, then through the relay coil 117a, lines 124 and 132, armature 117c, lines 131, 130, 129, and thence through blade 96a in either of its positions, through line 133 or 134 back to L2 as described in the preceding sentence for the motor circuit.

At predetermined points during the travel of cross-head pin 62 around the path of chain 57, the rheostat switch 96 is closed and opened as previously described in connection with cams 94 and 95. When switch blade 96a is in its dot-dash position, the selected resistance of rheostat 81 is placed in circuit with the windings of motor 52 so as to slow down the motor speed. At all other times switch blade 96a is in its full line position of Fig. 18 and the motor runs at the governor-controlled speed.

Referring to Fig. 18, when motor 52 reaches such a speed that the governor-controlled contacts 67 are opened, the circuit for motor 52 is through line 126 and winding 72 as previously described and thence through lines 136, 137, and 138, through resistors 70, and condenser 139 connected in parallel therewith, and then through lines 140, 141, motor 52, winding 71, line 127, switch 113 and the subsequent circuit previously described back to L2. The arrangement of resistors 70 and condenser 139 serves to muffle the arc between contacts 67 which, as previously stated, flutter at high frequency.

Referring to Fig. 18, the exposure switch 99 when closed by cam 100, as previously described, completes a circuit from binding post X1 through lines 142, 143, switch blade 99a and line 144 to binding post X2. As previously mentioned, a suitable energizing circuit for X-ray tube 36 is connected with the binding posts X1, X2, and the closing of switch 99 is intended to be analogous to the closing of switch 36 in the above-mentioned Goldfield and Graves Patent No. 2,267,908.

The switch 109 when used is closed by cam 100 just ahead of the closing of switch 99 and completes a circuit from S1 through lines 145, 146, blade 109a, and lines 147 and 148 to binding post S2. The circuit for energizing the rotating target, when such is used, is connected between these binding posts S1, S2.

My device is so constructed and arranged that it may be used without change for the production of stereoscopic pictures simply by means of throwing switch 113. When this switch is thrown toward S, as indicated in Fig. 9, the switch is in the full line position of Fig. 18. The circuit for motor 52 is then completed, following actuation of push button 119 and energization of relay coil 117a, from L1 through line 114, switch 112, line 126, winding 72, motor 52, winding 71, lines 127 and 149, blade 150a of stereoscopic switch 150, line 151, switch 113, line 128, and then through line 129 and the following circuit back to L2, previously described, until switch 97 moves to its "on" position and thereafter through switch blade 96a and through line 133 or 134 through blade 97a and back to L2 along the circuits previously described. Stereoscopic switch 150 has not been previously described but is clearly seen in Figs. 5 and 6. The switch blade 150a is in its "on" position as indicated in full lines in Fig. 18 when the motor is first energized to start the cross-head pin and slide from the position shown in Fig. 2. The cross-head pin will therefore continue to be moved by chain 57 and motor 52 until switch blade 150a is moved to its "off" position, indicated in dot-dash lines in Fig. 18, by cam 152 best seen in Fig. 8. When switch blade 150a is moved to its "off" position, the circuit to motor 52 is interrupted and the cross-head slide 63 stops. The magnitude of the stereo-shift just described is approximately one-tenth of the focal distance from the X-ray tube target to the body plane to be photographed. This is generally of the order of a few inches. The speed of travel should be set very slow or at "8" on the "speed" or radially innermost scale where pointer 76 is set in Fig. 9.

This insures that the heavy parts are moving at slow speed and will stop accurately in the predetermined position. It will be understood by those skilled in this art that a picture is first taken when the slide 63 is in its initial or starting position as shown in Fig. 2, and after the stereo-shift has been made and cam 152 has caused the parts to come to a stop, a second exposure is made thus giving the two views necessary to provide a stereoscopic view.

When a stereoscopic exposure has been made as above described, the parts are returned to the initial position shown in Fig. 2 simply by throwing switch 113 to the side marked "L" and indicated in dot-dash lines in Fig. 18. This completes the circuit through motor 52 again, and the cross-head pin 62 continues on its travel about sprockets 58 and 56 until automatically stopped by switch 97 in the position shown in Fig. 2. The apparatus is then ready either for another stereoscopic operation or for laminography.

Figure 17:
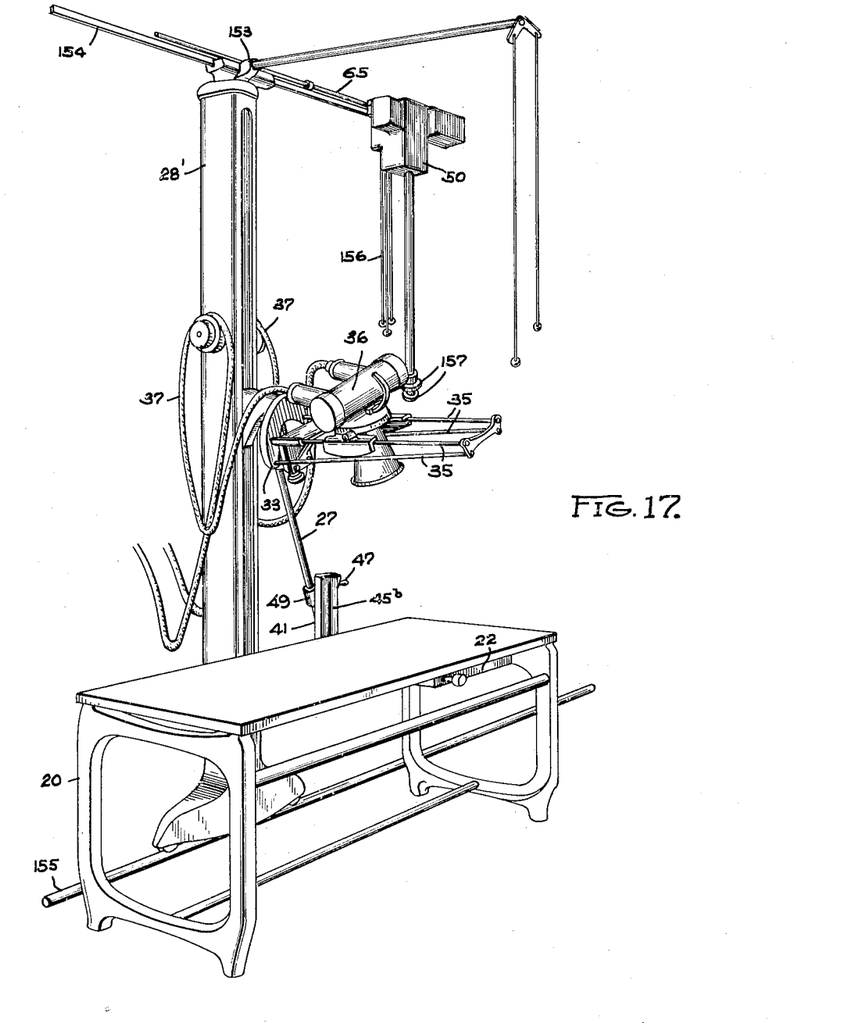

In Fig. 17 I have shown a modified manner of mounting the device thus described to produce the same result. Here similar parts have been given similar numbers, and the only difference is that the housing 50 has been mounted on the ceiling and the rod 65 connected with column 28' at the point 153 instead of at the point 28a previously described in connection with column 28 of slightly different form. This column 28' is mounted for movement on track 154 attached to the ceiling or other overhead support and track 155 mounted on or near the floor. The controls connected with housing 50 are provided with downwardly-extending control members 156 and 157 so that they are within reach of the operator. Other than as just mentioned, the parts are like those previously described and have the same functions and therefore further description is believed to be unnecessary.

The microswitches 96, 97, 99, 109, and 150 are of the type described in U. S. Letters Patent No. 1,960,020 granted May 22, 1934, to P. K. McGall; but any other suitable switch might be used.

What I claim is:

1. Apparatus for laminography of the type wherein an X-ray tube and a plate holder are mounted on a reciprocatable carriage means for oscillation on opposite sides of a selected body section, comprising driving means movable in a continuous elongated path having reverse bends at its opposite ends, an operative connection between said driving means and said carriage means, an electric motor and associated energizing circuit for moving said driving means at a given speed along a portion of said path between said bends, and means for introducing additional resistance into said motor circuit when said driving means is traversing said reverse bend portions of said path.

2. Apparatus for laminography of the type wherein an X-ray tube and a plate holder are mounted on a reciprocatable carriage means for oscillation on opposite sides of a selected body section, comprising driving means movable in a continuous elongated path having reverse bends at is opposite ends, an operative connection between said driving means and said carriage means, an electric motor and associated energizing circuit for moving said driving means, governor means for holding said motor speed substantially constant, and means for varying said governor means to hold different controlled speeds, whereby the varying conditions of laminography may be met.

3. Apparatus for laminography of the type wherein an X-ray tube and a plate holder are mounted on a reciprocatable carriage means for oscillation on opposite sides of a selected body section, comprising driving means movable in a continuous elongated path having reverse bends at its opposite ends, an operative connection between said driving means and said carriage means, an electric motor and associated energizing circuit for moving said driving means at a given speed along a portion of said path between said bends, governor means for holding said motor speed substantially constant, means for setting said governor means to hold different motor speeds, means for introducing additional resistance into said motor circuit when said driving means is traversing said reverse bend portions of said path, and means coordinating said last named means and said governor setting means to increase the resistance introduced into said circuit when said governor-controlled speed is increased.

4. Apparatus for laminography of the type wherein an X-ray tube and a plate holder are mounted on a reciprocatable carriage means for oscillation on opposite sides of a selected body section, comprising driving means movable in a continuous elongated path having reverse bends at its opposite ends, an operative connection between said driving means and said carriage means, an electric motor and associated energizing circuit for moving said driving means, and means for introducing additional resistance into said circuit as said driving means approaches a predetermined point, and means for opening said motor circuit when said driving means reaches said point.

5. The combination of claim 1 wherein said additional resistance is retained in said motor circuit as said driving means approaches a predetermined point intermediate said reverse bends, and means for opening said motor circuit when said driving means reaches said point.

6. Apparatus for laminography of the type wherein an X-ray tube and a plate holder are mounted on a reciprocatable carriage means for oscillation on opposite sides of a selected body section, comprising driving means movable in a continuous elongated path having reverse bends at its opposite ends, an operative connection between said driving means and said carriage means, an electric motor and associated energizing circuit for moving said driving means at a given speed along a portion of said path between said bends, governor means for holding said motor speed substantially constant, gear operated means for setting said governor means to hold different motor speeds, gear controlled means for introducing additional resistance into said motor circuit when said driving means is traversing said reverse bend portions of said path, and a gear train connecting said gear operated means and said gear controlled means.

7. Apparatus for laminography of the type wherein an X-ray tube and a plate holder are mounted on a reciprocatable carriage means for oscillation on opposite sides of a selected body section, comprising a pair of sprockets, an endless chain passing around said sprockets, electric motor means and its associated energizing circuit for driving one of said sprockets, connecting means between said chain and said carriage means, one end of said connecting means mounted on said chain, and means movable in timed relation to said chain for introducing additional resistance into said motor circuit as said connecting means end passes around said sprockets.

8. Apparatus for laminography of the type wherein an X-ray tube and a plate holder are mounted on a reciprocatable carriage means for oscillation on opposite sides of a selected body section, comprising driving means movable in a continuous elongated path having reverse bends at its opposite ends, an operative connection between said driving means and said carriage means, means providing substantially uniform linear motion of said driving means along a portion of said path between said bends, switch means adapted to control energization of said X-ray tube, and means for operating said switch means during said uniform movement of said driving means.

9. Apparatus for laminography of the type wherein an X-ray tube and a plate holder are mounted on a reciprocatable carriage means for oscillation on opposite sides of a selected body section, comprising driving means movable in a continuous elongated path having reverse bends at its opposite ends, an operative connection between said driving means and said carriage means, an electric motor and associated energizing circuit for moving said driving means at substantially uniform speed along a portion of said path between said bends, switch means adapted to control energization of said X-ray tube, and means for operating said switch means during the travel of said driving means along said portion of said path.

10. The combination of claim 8 including means for setting said last named means with relation to the position of said driving means along said portion of said path.

11. The combination of claim 9 wherein said last named means is movable in timed relation to the movement of said driving means and adjustable relative thereto.

12. The combination of claim 9 wherein said last named means includes a cam movable in timed relation to the movement of said driving means, said switch means being movably mounted relative to said cam, and means for holding said switch means in different adjusted positions relative to said cam.

13. Apparatus for laminography of the type wherein an X-ray tube and a plate holder are mounted on a reciprocatable carriage means for oscillation on opposite sides of a selected body section, comprising electric motor operated driving means for reciprocating said carriage means, an energizing circuit for said motor, stop means operable in timed relation to said driving means for opening said circuit at a predetermined point of the travel of said carriage means, a second energizing circuit for said motor, means for selecting one or the other of said circuits, and stop means for opening said second circuit at a predetermined interval of travel of said carriage means beyond said predetermined point, whereby a stereoscopic shift is provided.

14. The combination of claim 1 wherein said additional resistance is retained in said motor circuit as said driving means passes beyond one of said bends and approaches a predetermined point intermediate said reverse bends, stop means for opening said motor circuit when said driving means reaches said point, a second energizing circuit for said motor, and stop means for opening said second circuit when said driving means has passed a predetermined distance beyond said point.

15. Apparatus for laminography of the type wherein an X-ray tube and a plate holder are mounted on a reciprocatable carriage means for oscillation on opposite sides of a selected body section, comprising a pair of sprockets, a chain in driving relation with said sprockets, a pin carried by said chain, a crosshead slide mounted for reciprocating motion back and forth between said sprockets, said pin reciprocable in said slide, connecting means between said slide and said carriage means, electric motor means for driving one of said sprockets, an energizing circuit for said motor, a rheostat, switch means for cutting said rheostat into and out of said circuit, switch means for interrupting said circuit, switch means adapted to control energization of said X-ray tube, and means operable in timed relation to said driven sprocket for actuating all of said switch means.

16. Apparatus for laminography of the type wherein an X-ray tube and a plate holder are mounted on a reciprocatable carriage means for oscillation on opposite sides of a selected body section, comprising drive means movable in a continuous and complete circuit about a path having separate advance and return runs connected by reverse bends, relatively slidable connecting parts between said drive means and said carriage means providing a continuously operative connection between them along both said advance and return runs, means for slowing said drive means as it approaches a predetermined point between said reverse bends, and means for stopping said drive means when it reaches said point, whereby an exact termination of the cycle of said drive means is always insured.

17. Apparatus for laminography of the type wherein an X-ray tube and a plate holder are mounted on a reciprocatable carriage means for oscillation on opposite sides of a selected body section, comprising driving means movable in a continuous and complete circuit about an elongated path having separated advance and return runs connected by reverse bends at its opposite ends, an operative connection between said driving means and said carriage means adapted to travel about said reverse bends, means operatively associated with said driving means for providing substantially uniform linear motion thereof at a given speed when said connection is traveling along a portion of said path between said bends, and operating means responsive to motion of said driving means for controlling said last named means to reduce the speed of said driving means below said given speed when said connection is traveling around the reverse bend portions of said path.

ROBERT J. STAVA.

REFERENCES CITED

The following references are of record in the file of this patent:

UNITED STATES PATENTS

| Number | Name | Date |
| --- | --- | --- |
| 1,599,395 | Hards | Sept. 7, 1926 |
| 1,827,959 | Stahelin | Oct. 20, 1931 |
| 2,156,170 | Augustin et al. | Apr. 25, 1939 |
| 2,167,114 | Kieffer | July 25, 1939 |
| 2,235,143 | Colcher | Mar. 18, 1941 |
| 2,353,145 | Chamberlain | July 11, 1944 |